(12) United States Patent
Terao (10) Patent No.: US 8,479,280 B2
(45) Date of Patent: Jul. 2, 2013

(54) IMAGE PROCESSING DEVICE AND IMAGE DATA TRANSMISSION METHOD

(75) Inventor: Yoshihide Terao, Yokohama (JP)

(73) Assignee: Canon Kabushiki Kaisha (JP)

( * ) Notice: Subject to any disclaimer, the term of this patent is extended or adjusted under 35 U.S.C. 154(b) by 1285 days.

(21) Appl. No.: 11/678,692

(22) Filed: Feb. 26, 2007

(65) Prior Publication Data

US 2007/0212027 A1    Sep. 13, 2007

(30) Foreign Application Priority Data

Feb. 27, 2006    (JP) .................................. 2006-050744

(51) Int. Cl.
   *G06F 21/00*    (2013.01)

(52) U.S. Cl.
   USPC ........ 726/20; 726/2; 726/16; 726/17; 726/26; 726/27; 358/400; 358/401; 358/426.12; 358/471

(58) Field of Classification Search
   USPC ..... 358/1.13, 1.15; 385/95; 706/23; 707/100, 707/104.1
   See application file for complete search history.

(56) References Cited

U.S. PATENT DOCUMENTS

| 7,036,739 | B1 * | 5/2006 | Mann et al. .................... 235/487 |
| 2002/0152169 | A1 * | 10/2002 | Dutta et al. ...................... 705/45 |
| 2006/0242094 | A1 * | 10/2006 | Tamakoshi ....................... 706/23 |
| 2006/0268323 | A1 * | 11/2006 | Hashimoto .................. 358/1.15 |

FOREIGN PATENT DOCUMENTS

| JP | 2003-224728 A | 8/2003 |
| JP | 2004-094494 A | 2/2004 |
| JP | 2004-094494 A | 3/2004 |
| JP | 2004-312302 A | 11/2004 |

\* cited by examiner

*Primary Examiner* — Brandon Hoffman
*Assistant Examiner* — Thomas C Lauzon
(74) *Attorney, Agent, or Firm* — Rossi, Kimms & McDowell LLP (57) ABSTRACT

An image processing device includes: a reading unit to read information stored in a detachable storage medium; a transmission unit to transmit image data outwardly; a determination unit to determine, in a case where the transmission unit transmits the image data, whether or not the information stored in the detachable storage medium is necessary; and a control unit to execute, in a case where the determination unit determines that the information stored in the detachable storage medium is necessary, control to maintain a state capable of reading the information stored in the detachable storage medium until the reading unit reads from the detachable storage medium the information necessary to transmit the image data.

7 Claims, 7 Drawing Sheets

IMAGE PROCESSING DEVICE AND IMAGE DATA TRANSMISSION METHOD

BACKGROUND OF THE INVENTION

1. Field of the Invention

The present invention relates to an image processing device and an image data transmission method.

2. Description of the Related Art

Conventionally, an image processing device which has a function (user authentication function) for executing user authentication when a user uses the relevant image processing device exists. Further, an image processing device which has the user authentication function using an IC card as a method of increasing security of the user authentication function exists (for example, Japanese Patent Application Laid-Open No. 2004-312302).

In the meantime, in the device for which the user authentication is necessary, if any operation is not executed by the user for a certain period of time in a login state after execution of the user authentication, the device is automatically logged off (logged out). That is, the user authenticated state is automatically released.

However, in the related art, there occurs a problem that the image processing device cannot access the information in the IC card if the device is logged off. More specifically, it is assumed that the image processing device intends to execute a job of transmitting image data by using the information in the IC card. In such a case, if the image processing device is logged off before execution of the relevant job, there occurs a problem that this job cannot be executed.

SUMMARY OF THE INVENTION

The present invention has been completed in consideration of the above-described problems. That is, the present invention is to provide an image processing device which changes, in case of executing a job utilizing information stored in a detachable storage medium, its state to a state incapable of reading the information stored in the detachable storage medium until the information stored in the detachable storage medium is read out.

To solve the above-described problems, an image processing device according to the present invention is characterized by comprising: a reading unit configured to read information stored in a detachable storage medium; a transmission unit configured to transmit image data outwardly; a determination unit configured to determine, in a case where the transmission unit transmits the image data, whether or not the information stored in the detachable storage medium is necessary; and a control unit configured to execute, in a case where the determination unit determines that the information stored in the detachable storage medium is necessary, control to maintain a state capable of reading the information stored in the detachable storage medium until the reading unit reads from the detachable storage medium the information necessary to transmit the image data.

Further, an image data transmission method according to the present invention is characterized by an image data transmission method which is applied to an image processing device including a reading unit configured to read information stored in a detachable storage medium, the method comprising the steps of: accepting an execution instruction of a transmission job for transmitting image data outwardly; determining, in a case where the transmission job of which the execution instruction was accepted in the accepting step is executed, whether or not the information stored in the detachable storage medium is necessary; executing the transmission job of which the execution instruction was accepted in the accepting step; and executing, in a case where it is determined in the determining step that the information stored in the detachable storage medium is necessary to execute the transmission job, control to maintain a state capable of reading the information stored in the detachable storage medium until the information necessary in the transmitting step is read from the detachable storage medium.

Such an object of the present invention as described above and other object and features of the present invention will become apparent from the following description of the exemplary embodiments with reference to the attached drawings.

DESCRIPTION OF THE EMBODIMENTS

Hereinafter, the exemplary embodiments of the present invention will be described with reference to the attached drawings.

(First Exemplary Embodiment)

Figure 1:
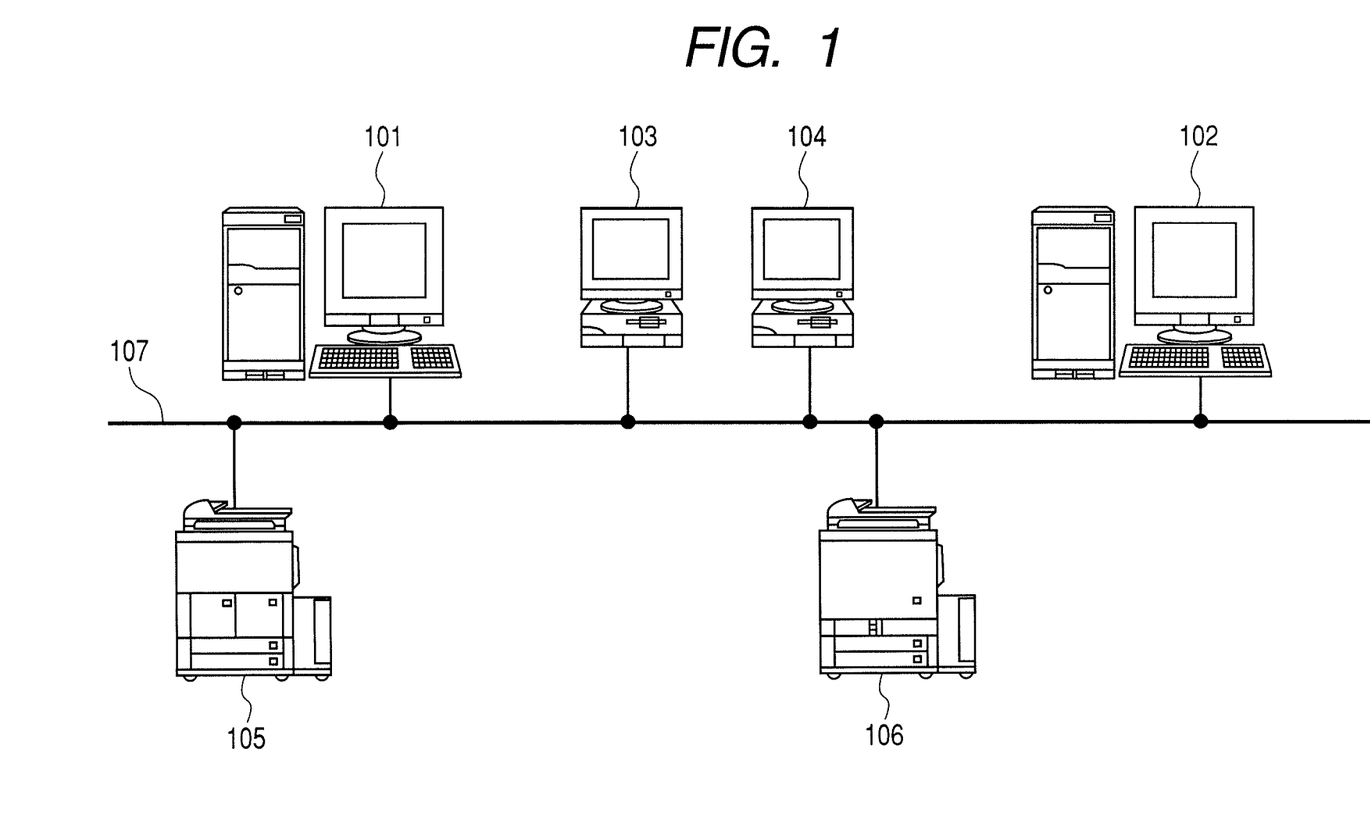
FIG. 1 a diagram illustrating an example of the whole constitution of a system according to the exemplary embodiment of the present invention.

FIG. 1 a diagram illustrating an example of the whole constitution of a system according to the first exemplary embodiment of the present invention. That is, as illustrated in FIG. 1, a mail server 101, a file sharing server 102, a client PC (personal computer) 1 (103), a client PC 2 (104), a black-and-white multifunction device 105 and a color multifunction device 106 are together connected to a network 107 made by an Ethernet or the like. In this network, the mail server 101 has the function of transmitting E-mails transmitted from the client PC 1 (103), the client PC 2 (104) and the like to a transmission destination.

The file sharing server 102 has the function of enabling various users to share a folder on the file sharing server 102 through the network, and each of the client PC 1 (103) and the client PC 2 (104) can transmit electronic data to the folder on the file sharing server 102.

Each of the black-and-white multifunction device 105 and the color multifunction device 106, which is an example of an image processing device, has not only the function of copying a paper document but also the function of converting a scanned paper document into electronic data, transmitting thus acquired electronic data as an E-mail, and transmitting the relevant electronic data to the folder on the file sharing server 102.

Figure 2:
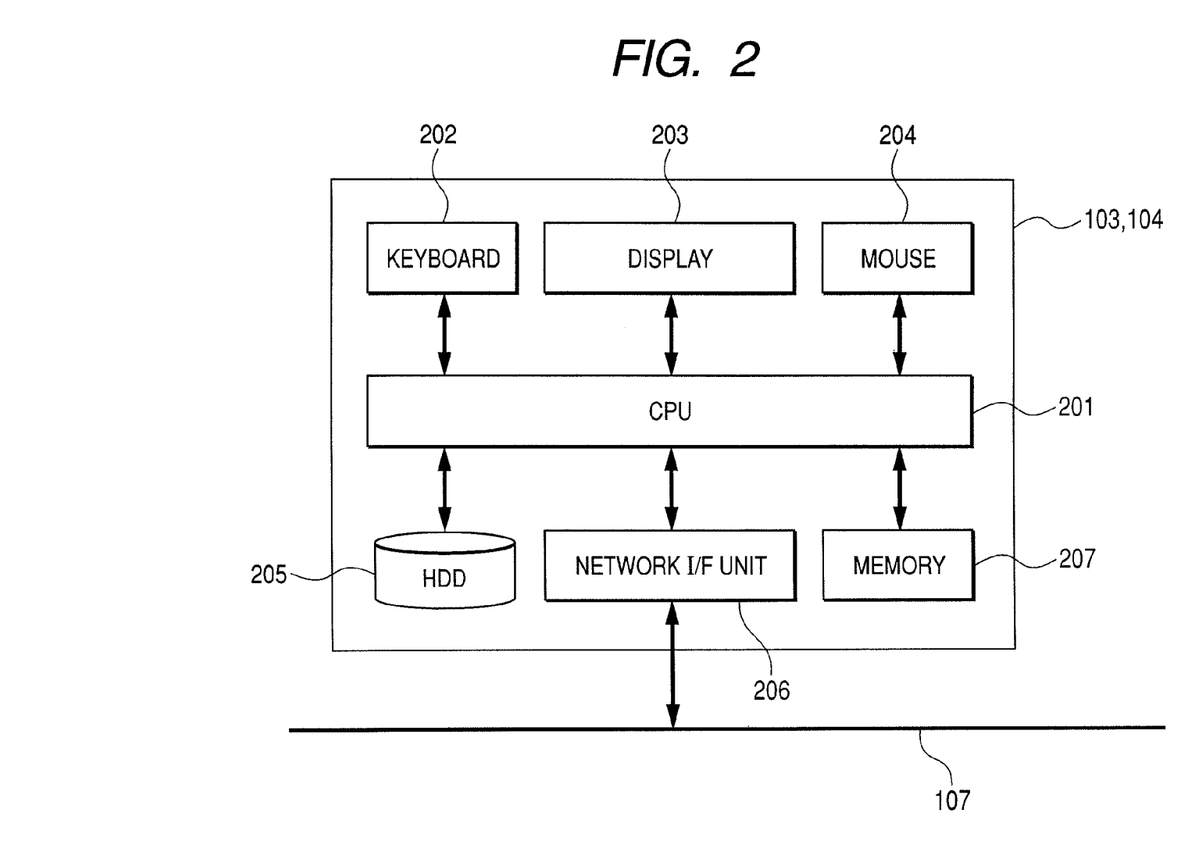
FIG. 2 is a block diagram illustrating an example of the hardware constitution of each of computers such as a mail server 101, a file sharing server 102, a client PC 1 (103), and a client PC 2 (104).

FIG. 2 is a block diagram illustrating an example of the hardware constitution of each of computers such as the mail server 101, the file sharing server 102, the client PC 1 (103), and the client PC 2 (104).

As illustrated in FIG. 2, each of the computers includes a CPU (central processing unit) 201, a keyboard 202, a display 203, a mouse 204, an HDD (hard disk drive) 205, a network I/F (interface) unit 206, and a memory 207.

Here, the CPU 201 executes whole control of the computer, and the key board 202 and the mouse 204 are used to input various operation information to the computer according to user's handlings or operations.

The display 203 displays a screen. The display 203, the keyboard 202 and the mouse 204 together constitute a user interface of the computer. The data to be managed in the computer is stored in the HDD 205. The network I/F unit 206 is the interface for connecting the computer to the network 107. Further, the data to be used in the process of the CPU 201 is temporarily stored in the memory 207.

Figure 3:
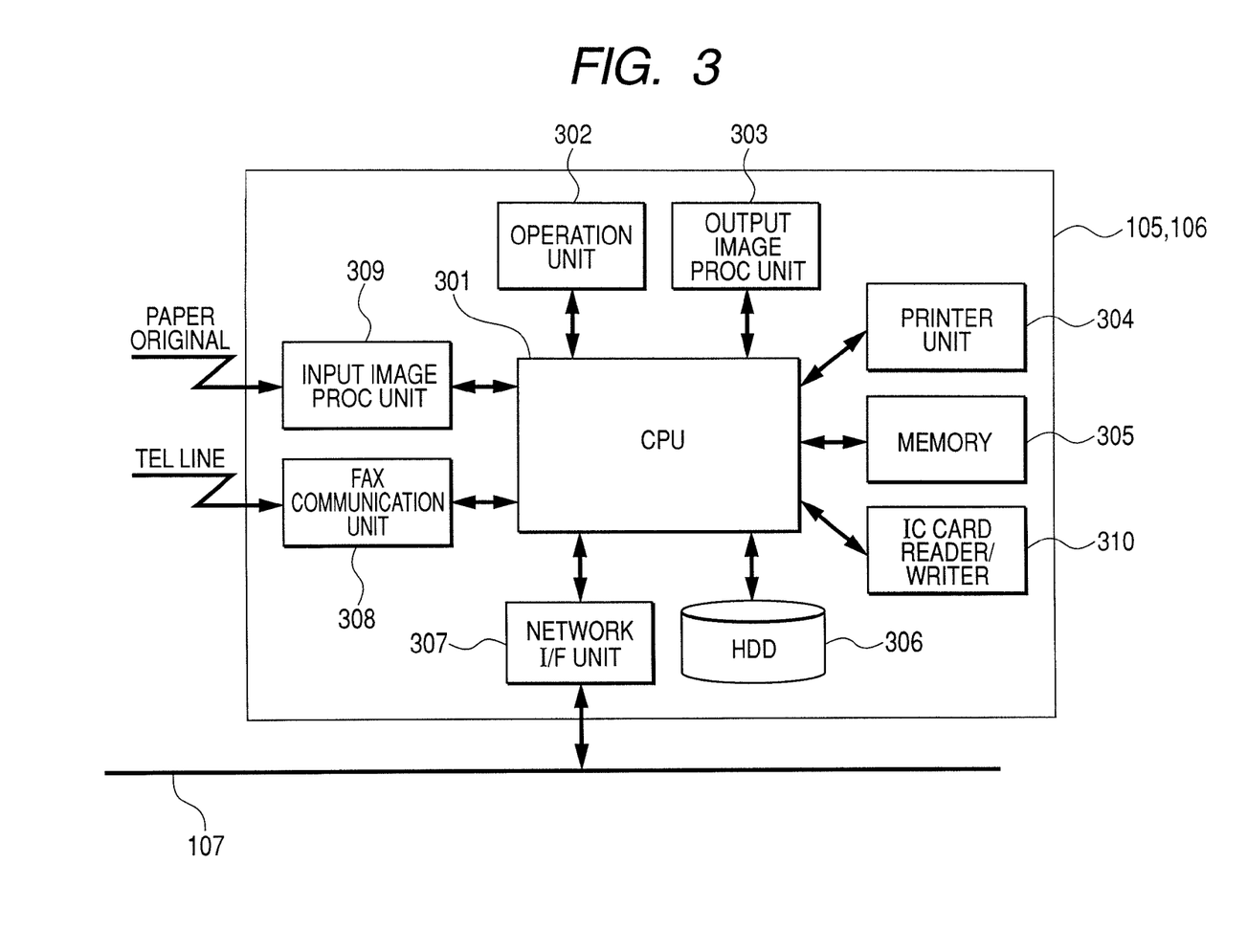
FIG. 3 is a block diagram illustrating an example of the hardware constitution of each of multifunction devices such as a black-and-white multifunction device 105 and a color multifunction device 106.

FIG. 3 is a block diagram illustrating an example of the hardware constitution of each of the multifunction devices such as the black-and-white multifunction device 105 and the color multifunction device 106. Here, it should be noted that the black-and-white multifunction device 105 and the color multifunction device 106 are different from each other only in the point that the former device manages only black-and-white image data and the latter device manages both black-and-white image data and color image data. Therefore, in FIG. 3, the internal constitution of the unit for managing image data is different between the black-and-white multifunction device 105 and the color multifunction device 106, but other constitutions are common between the black-and-white multifunction device 105 and the color multifunction device 106.

As illustrated in FIG. 3, each of the multifunction devices includes a CPU 301, an operation unit 302, an output image processing unit 303, a printer unit 304, a memory 305, an HDD 306, and a network I/F unit 206. Further, each multifunction device includes a FAX (facsimile) communication unit 308, an input image processing unit 309, and an IC card reader/writer (or portable memory reader) 310.

Here, the CPU 301 executes whole control of the multifunction device. The operation unit 302 accepts user's handlings or operations, inputs received various operation information into the multifunction device, and displays various information under the control of the CPU 301. Incidentally, an example of the operation unit 302 is illustrated in FIG. 4.

The output image processing unit 303 processes an input (or scanned) image to generate an output image, and a printer unit 304 outputs onto a paper the output image generated by the output image processing unit 303. Further, the data to be used in the process of the CPU 301 is temporarily stored in the memory 305. The data to be managed is stored in the HDD 305. Further, the network I/F unit 307 is the interface for connecting the multifunction device to the network 107.

The FAX communication unit 308 executes facsimile transmission/reception through a telephone line, and the input image processing unit 309 scans a paper original to generate input image data. The IC card reader/writer 310 reads/writes data from/to an inserted portable memory. In the following, to simplify the description, an IC card is used as an example of the portable memory. Incidentally, an example of the data stored in the IC card will be illustrated in FIG. 5.

Figure 4:
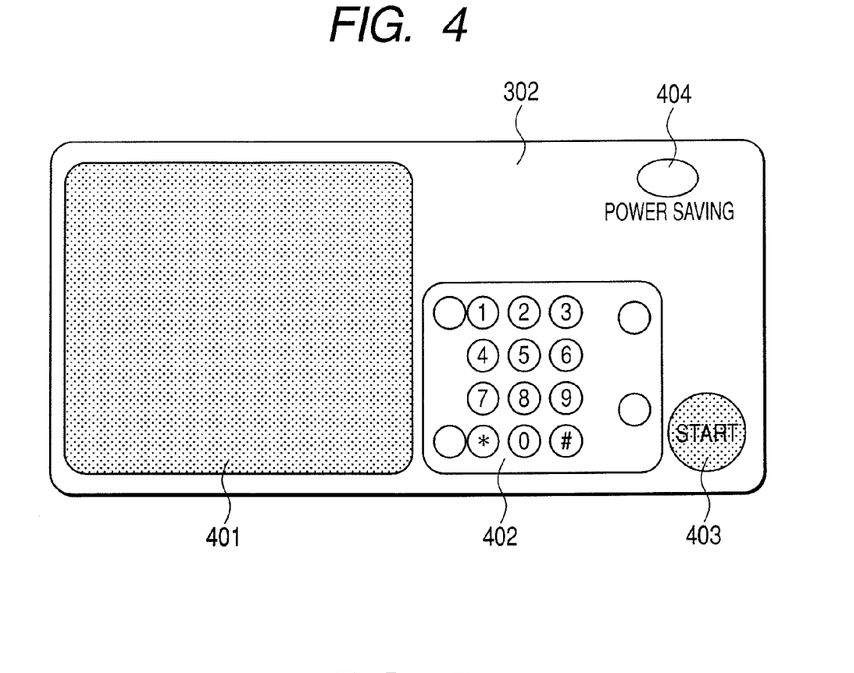
FIG. 4 is a diagram illustrating an example of an operation unit 302.

FIG. 4 is the diagram illustrating the example of the operation unit 302. As illustrated in FIG. 4, the operation unit 302 includes a liquid crystal panel 401, a numeric keypad 402, a start button 403, and a power saving key 404.

The liquid crystal panel 401 is the panel on which the information to be watched by a user is displayed. Incidentally, the liquid crystal panel 401 may be made by a touch panel, so that the user inputs various information to the multifunction device by using the touch panel. The numeric keypad 402 includes various keys for inputting numeric information and the like to the multifunction device.

The start button 403 is the button by which the user causes the multifunction device to start executing various jobs, and the power saving key 404 is the button by which the user changes the current mode to the mode (power saving mode) for reducing power consumption of the multifunction device. For example, as described later, if the power saving key 404 is depressed in the state that the IC card has been inserted into the multifunction device and thus the relevant device has been logged in, the multifunction device executes a process for logoff to set the state that data reading/writing from/to the IC card cannot be executed.

Figure 5:
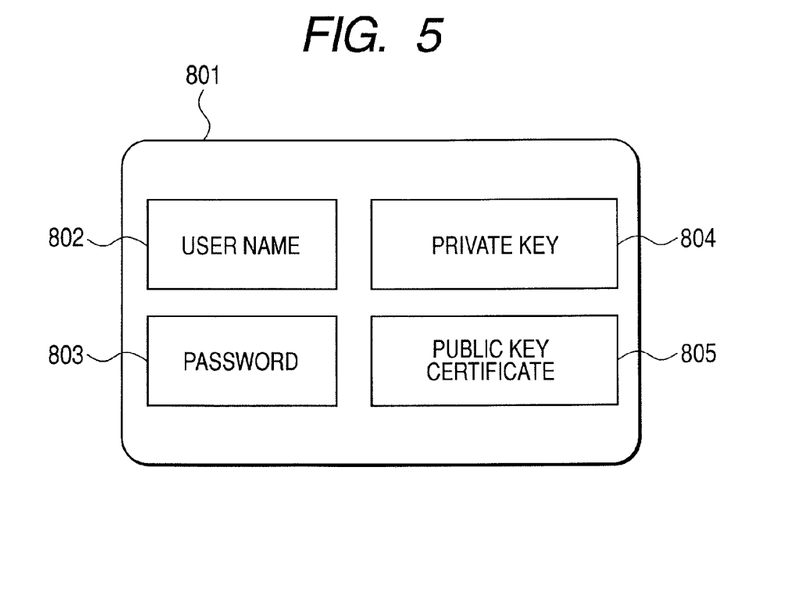
FIG. 5 is a diagram illustrating an example of the data stored in an IC card.

FIG. 5 is the diagram illustrating the example of the data stored in the IC card. As illustrated in FIG. 5, a user name 802, a password 803, a private key 804, and a public key certificate 805 have been stored in an IC card 801.

Here, the user name 802 is the information for uniquely identifying a user, and is used to log in the image processing device. It should be noted that the user name 802 is also called "user ID".

Also, the password 803 is used when the user logs in the image processing device.

The private key 804 is the key used for encryption and decryption, and is given to only the user who has the IC card 801.

The public key certificate 805 is the certificate which is issued by a trusted third party to certify the relation of the private key 804, the public key paired with the private key 804, and a legal and rightful owner of the relevant public key (that is, the owner of the IC card 801). Here, it should be noted that the public key certificate 805 includes the information such as the public key signed by the trusted third party, the user name, the term of validity of the certificate, and the like.

Figure 6:
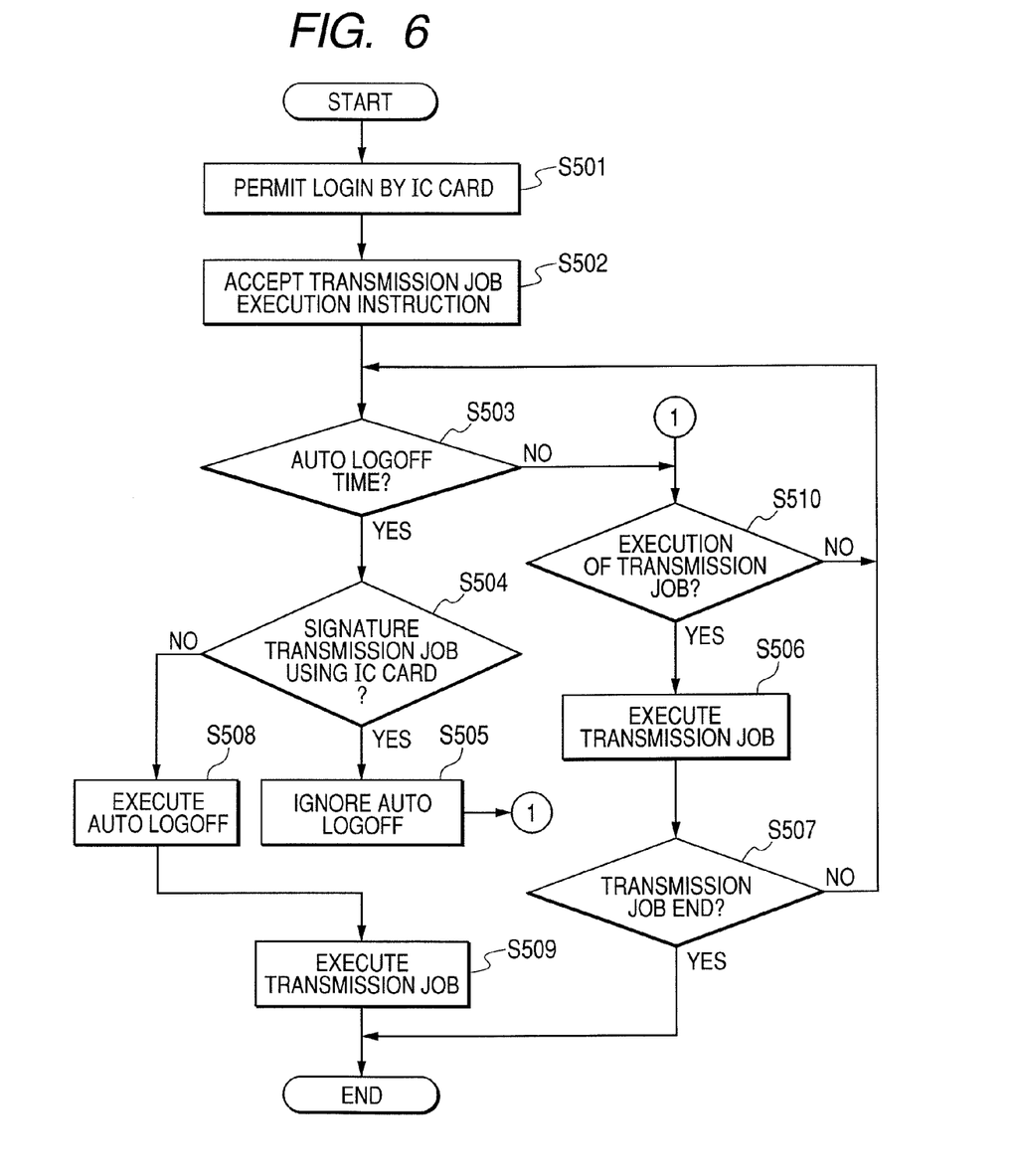
FIG. 6 is a flow chart describing an example of the transmission process to be executed by the multifunction device 105.

FIG. 6 is a flow chart describing an example of the image transmission process to be executed by the image processing device. Here, it should be noted that the process of the relevant flow chart is executed under the control of the CPU 301 provided in the black-and-white multifunction device 105 or the color multifunction device 106. In the following, this process will be described as the image transmission process to be executed by the black-and-white multifunction device 105 (simply called the multifunction device 105 hereinafter). However, the black-and-white multifunction device 105 may be replaced by the color multifunction device 106.

Initially, the user inserts the IC card 801 which is the portable memory into the IC card reader/writer 310. Then, the multifunction device 105 reads the user name 802 and the password 803 stored in the IC card 801, through the IC card reader/writer 310. On the other hand, pairs of user names and passwords capable of logging in the multifunction device 105 have been previously stored in the HDD 306. Thus, the CPU 301 searches from the HDD 306 the user name same as the user name 802 read from the IC card 801. Then, in a case where the relative user name is found from the HDD 306 as the result of search, if the password paired with the user name found from the HDD 306 coincides with the password 803 read from the IC card 801, the CPU 301 permits the user who inserted the IC card 801 to log in the multifunction device 105 (S501). On the other hand, in a case where the user name same as the user name 802 read from the IC card 801 is not found from the HDD 306 in the step S501, the CPU 301 inhibits the relevant user from logging in the multifunction device 105, and the process ends. Further, even in a case where the user name same as the user name 802 read from the IC card 801 is found from the HDD 306 but the password paired with the user name found from the HDD 306 does not coincide with the password 803 read from the IC card 801, the CPU 301 likewise inhibits the relevant user from logging in the multifunction device 105, and the process ends.

Next, the user designates transmission destination and transmission protocol of the image data through the operation unit 302 and the like. Further, the user designates a time of transmitting the image data according to need. Then, for example, if the user sets a paper original to the input image processing unit 309 and depresses the start button 403, the multifunction device 105 accepts reservation for executing an image data transmission job. If the time of transmitting the image data is designated, the multifunction device 105 accepts the reservation as a "reserved transmission job". Then, the paper original set on the input image processing unit 309 is read, the original image data is generated based on the read paper original, and the generated image data is stored in the HDD 306 (S502).

After the user was authenticated and thus the authenticated user logged in the multifunction device 105 in the step S501, the state that the IC card reader/writer 310 can access the IC card 801 is maintained. However, if the operation unit 302 is not handled or operated for a predetermined time, the multifunction device 105 automatically releases the login state. This operation is called "auto logoff". After the auto logoff, it is controlled by the CPU 301 of the multifunction device 105 to inhibit the IC card reader/writer 310 from accessing the IC card 810. Incidentally, the time for executing the auto logoff is previously set by the user or an administrator, and the set time is stored in the HDD 306 or the like of the multifunction device 105. This time is called "auto logoff time".

Next, the multifunction device 105 determines whether or not it becomes the auto logoff time set in a setting file stored in, for example, the HDD 306 (S503). If it is determined that it becomes the auto logoff time (YES in the step S503), the multifunction device 105 further determines whether or not the transmission job accepted in the step S502 is the transmission using the information in the IC card 801 and the transmission in the relevant transmission job has ended (S504).

Here, it should be noted that the transmission using the information in the IC card 801 is, for example, electronic signature transmission which uses the private key 804 and the public key certificate 805. Besides, the transmission using the information in the IC card 801 may be a case where information of a transmitter acquired from the IC card 801 is added to transmission image data and then actually transmitted. For example, in a case where image data is attached to an E-mail and the relevant E-mail is then transmitted, it is supposed that an E-mail address to be input to a "from:" field of the relevant E-mail is acquired from the IC card 801. In this case, such an operation is equivalent to the transmission using the information in the IC card 801.

Then, if it is determined in the step S504 that the transmission job accepted in the step S502 is the transmission not using the information in the IC card 801, or if it is determined in the step S504 that the transmission job accepted in the step S502 is the transmission using the information in the IC card 801 but the transmission in the relevant transmission job has ended, the multifunction device 105 executes an auto logoff process (S508).

If the logoff process is executed, the multifunction device 105 releases the authentication of the user who logged in the multifunction device 105 in the step S501. Further, if the IC card 801 remains being inserted in the IC card reader/writer 310 at the time when the logoff process is executed, the CPU 301 inhibits the IC card reader/writer 310 from reading/writing the data from/to the IC card 801 remaining being inserted. Then, if it is detected that the IC card 801 has been removed from the IC card reader/writer 310, the CPU 301 permits the IC card reader/writer 310 to execute data reading/writing.

Even in the case where the multifunction device 105 executes the auto logoff process in the step S508, if the information in the IC card 801 is not used, the multifunction device 105 executes the transmission job accepted in the step S502 (S509). That is, in the step S509, the image data stored in the HDD 306 is transmitted to the destination designated in the step S502. Here, it is supposed that the destination includes the color multifunction device 106, the client PC 1 (103), the client PC 2 (104), the file sharing server 102, and the like.

Further, as a transmission method, it is supposed to use a method of attaching image data to an E-mail, or a method of using a protocol such as an FTP (File Transfer Protocol), a WebDAV (Distributed Authoring and Versioning protocol for the WWW) or the like. Especially, in the case where the image data is transmitted by using the E-mail, the transmission through the mail server 101 is executed.

On the other hand, if it is determined in the step S504 that the transmission job accepted in the step S502 is the transmission using the information in the IC card 801 but the transmission in the relevant transmission does not end, the multifunction device 105 does not execute the auto logoff process by ignoring it (S505), and the flow advances to a step S510.

Besides, if it is determined in the step S503 that it does not become the auto logoff time (NO in the step S503), the flow advances to the step S510.

In the step S510, the multifunction device 105 determines whether or not to start executing the transmission job. That is, if a time to transmit the image data has been designated in the transmission job accepted in the step S502, the multifunction device 105 determines whether or not to start executing the transmission job based on whether or not it becomes the designated time. On the other hand, if the time to transmit the image data is not designated in the transmission job accepted in the step S502, the multifunction device 105 determines to execute the transmission job, and the flow advances to a step S506. Meanwhile, if the multifunction device 105 determines not to execute the transmission job, the flow returns to the step S503.

In the step S506, the multifunction device 105 executes the transmission job accepted in the step S502. Here, if the transmission job to be executed by the multifunction device 105 is a job other than the transmission job which uses the information in the IC card 801, the following job is executed. That is, an electronic signature which is generated by using the private key 804 and the public key certificate 805 read from the IC card 801 is added to the image data stored in the HDD 306, and the acquired image data is transmitted to the destination. Here, as a transmission method, it is supposed to use a method of attaching the image data to an E-mail, or a method of using a protocol such as an FTP (File Transfer Protocol), a WebDAV (Distributed Authoring and Versioning protocol for the WWW) or the like.

Then, the multifunction device 105 determines whether or not the transmission job ends (S507). If it is determined that the transmission job ends, the process ends. On the other hand, if it is determined that the transmission job does not end yet, the flow returns to the step S503.

Incidentally, if it is determined in the step S504 that the transmission job accepted in the step S502 is the transmission using the information in the IC card 801 and the information necessary for the relevant transmission job has already been read out from the IC card 801, it is possible to determine that the relevant transmission job has ended.

Further, the auto logoff process may be executed after it is determined in the step S507 that the transmission job using the information in the IC card 801 has ended.

According to the process as described in the flow chart of FIG. 6, in the case where the user executes the transmission with the electronic signature added by using the information in the IC card, the auto logoff which is not intended by the user can be prevented. Therefore, it is possible to prevent a situation that the user cannot read out the information in the IC card while he/she is executing the transmission.

In particular, when the "reserved transmission job" is accepted in the step S502, the auto logoff is never executed before it becomes the transmission time, whereby the reserved transmission job can surely be executed.

Figure 7:
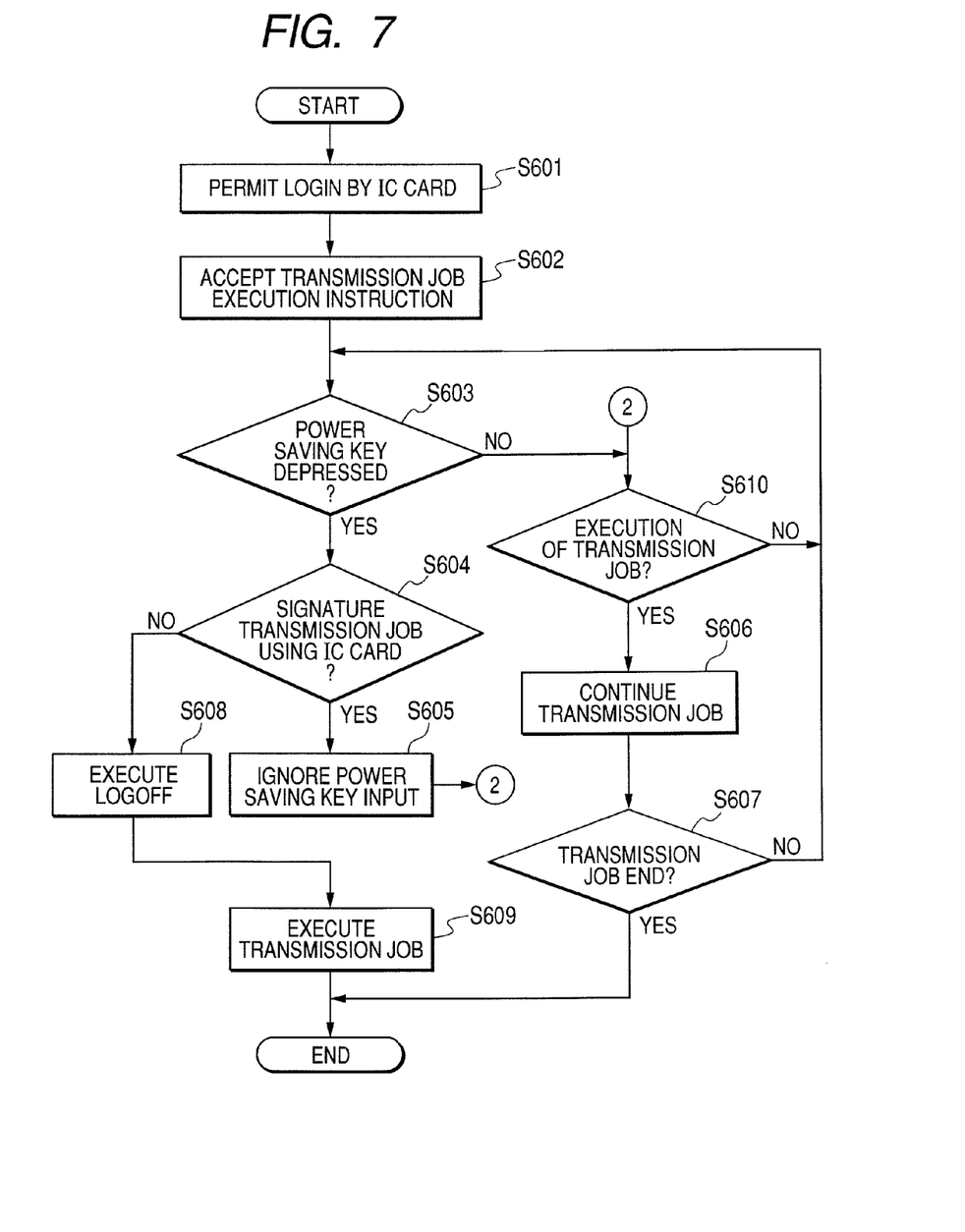
FIG. 7 is a flow chart describing another example of the transmission process to be executed by the multifunction device 105.

FIG. 7 is a flow chart describing another example of the transmission process to be executed by the image processing device according to the present embodiment. Here, the multifunction device 105 may execute not only the process in the flow chart of FIG. 6 but also the process in the flow chart of FIG. 7.

The flow chart of FIG. 6 describes the transmission process of the multifunction device 105 to be executed in the case where the auto logoff is executed if any operation to the multifunction device 105 is not executed for the predetermined time. On the other hand, the flow chart of FIG. 7 describes the process of the multifunction device 105 to be executed in a case where the power saving key is depressed by the user after an instruction to execute the transmission job was accepted.

In FIG. 7, the processes to be executed in steps S601 and S602 are respectively the same as those to be executed in the steps S501 and S502 described in FIG. 6, whereby the explanation thereof will be omitted.

In a step S603, the multifunction device 105 determines whether or not the power saving key 404 is depressed by the user. If it is determined that the power saving key 404 is not depressed by the user, the flow advances to a step S610. Then, in the step S601, the multifunction device 105 determines whether or not to start executing the transmission job. That is, if a time to transmit the image data has been designated in the transmission job accepted in the step S602, the multifunction device 105 determines whether or not to start executing the transmission job based on whether or not it becomes the designated time. On the other hand, if the time to transmit the image data is not designated in the transmission job accepted in the step S602, the multifunction device 105 determines to execute the transmission job, and the flow advances to a step S606. Meanwhile, if the multifunction device 105 determines not to execute the transmission job, the flow returns to the step S603.

In the step S606, the multifunction device 105 executes the transmission job accepted in the step S602. Here, the content of the transmission job to be executed by the multifunction device 105 in the step S606 is the same as that of the transmission job to be executed by the multifunction device 105 in the step S506 of FIG. 6.

Then, the multifunction device 105 determines whether or not the transmission job ends (S607). If it is determined that the transmission job ends, the process ends. On the other hand, if it is determined that the transmission job does not end yet, the flow returns to the step S603.

If it is determined in the step S603 that the power saving key 404 is depressed by the user, the flow advances to a step S604. In the step S604, the multifunction device 105 further determines whether or not the transmission job accepted in the step S602 is the transmission using the information in the IC card 801 (for example, the electronic signature transmission using the private key 804 and the public key certificate 805).

In the step S604, if the multifunction device 105 determines that the transmission job accepted in the step S602 is the transmission not using the information in the IC card 801, the flow advances to a step S608. In the step S608, the multifunction device 105 executes the logoff process, and the flow further advances to a step S609. Here, it should be noted that electrical power consumption of the multifunction device 105 is reduced in the power saving mode. More specifically, in this mode, a temperature of the fixing unit provided in the multifunction device is lowered, and a backlight of the liquid crystal panel provided on the operation unit 302 is turned off. Besides, in the case where the user is logging in the multifunction device 105, the relevant user is logged off as soon as the mode of the multifunction device 105 is changed to the power saving mode. At the same time, the multifunction device 105 inhibits the IC card reader/writer 310 from accessing the IC card 801.

Then, in the step S609, the multifunction device 105 executes the transmission job accepted in the step S602, and the process ends.

On the other hand, if the multifunction device 105 determines in the step S604 that the transmission job accepted in the step S602 is the transmission using the information in the IC card 801, the flow advances to a step S605. In the step S605, the multifunction device 105 ignores the depression of the power saving key 404 and does not execute the logoff process, and the flow further advances to the step S610. Incidentally, in the step S605, it is also possible to set the multifunction device 105 not to ignore the depression of the power saving key 404. More specifically, in this case, it is possible to permit, in response to the depression of the power saving key 404, the multifunction device 105 to enter into a mode for reducing the power consumption by not executing only the logoff process.

Further, if it is determined in the step S604 that the transmission job accepted in the step S602 is the transmission using the information in the IC card 801 and the information necessary for the relevant transmission job has already been read out from the IC card 801, it is possible to determine that the relevant transmission job has ended.

Furthermore, it is also possible to set the multifunction device 105 to enter into the mode for reducing the power consumption after it is determined in the step S607 that the transmission job using the information in the IC card 801 has ended.

According to the process as described in the flow chart of FIG. 7, in the case where the user executes the transmission with the electronic signature added by using the information in the IC card, the logoff can be prevented even if the power saving key 404 is intentionally depressed by the user. Therefore, it is possible to prevent a situation that the user cannot read out the information in the IC card while he/she is executing the transmission.

Figure 8:
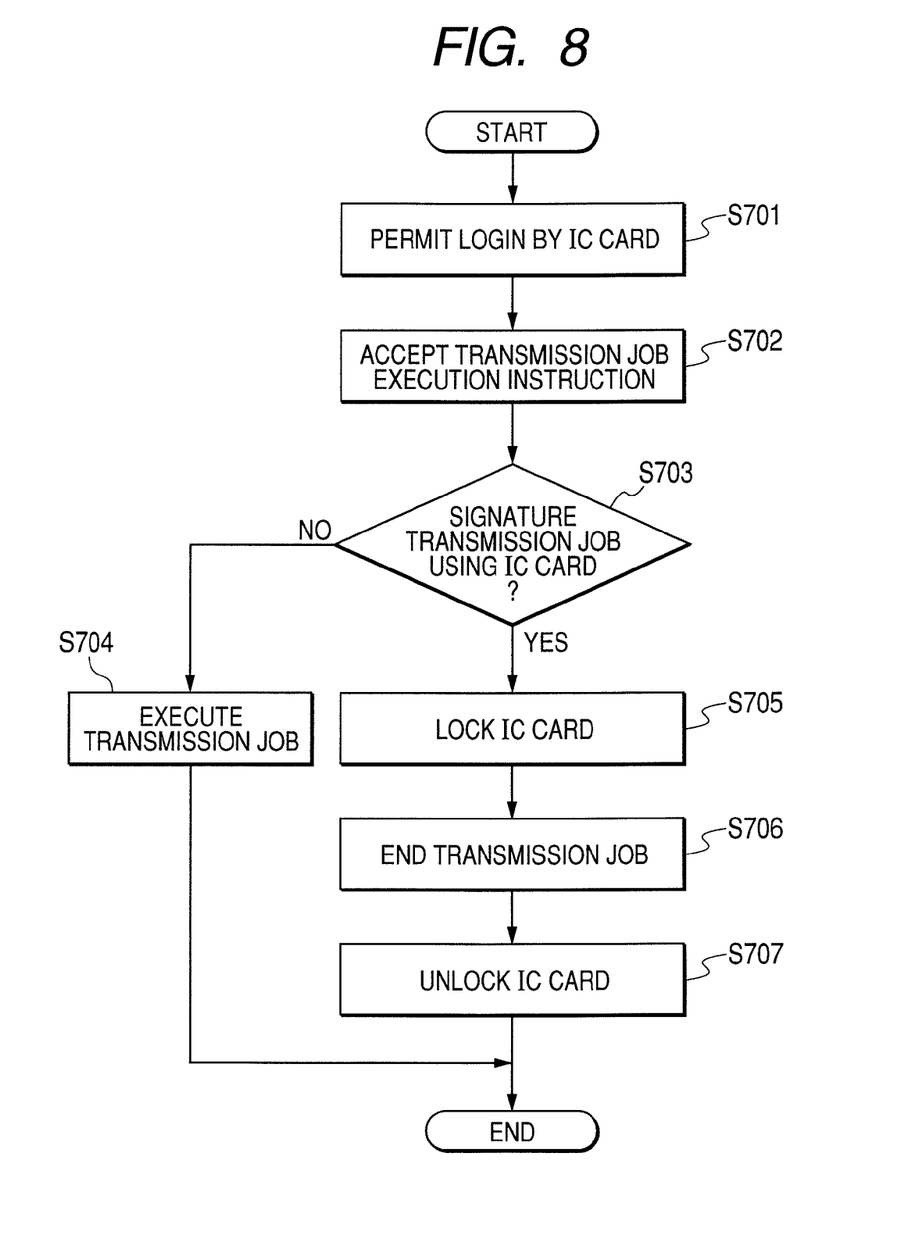
FIG. 8 is a flow chart describing still another example of the transmission process to be executed by the multifunction device 105.

FIG. 8 is a flow chart describing another example of the transmission process to be executed by the multifunction device 105 according to the present embodiment. Here, the multifunction device 105 may execute not only the process in the flow chart of FIG. 6 and/or the process in the flow chart of FIG. 7, but also the process in the flow chart of FIG. 8.

In FIG. 8, the processes to be executed in steps S701 and S702 are respectively the same as those to be executed in the steps S501 and S502 described in FIG. 6, whereby the explanation thereof will be omitted.

Then, if the transmission job is accepted, the flow advances to a step S703. In the step S703, the multifunction device 105 determines whether or not the transmission job accepted in the step S702 is the transmission using the information in the IC card 801 (for example, the electronic signature transmission using the private key 804 and the public key certificate 805).

In the step S703, if the multifunction device 105 determines that the transmission job accepted in the step S702 is the transmission not using the information in the IC card 801, the flow advances to a step S704. In the step S704, the multifunction device 105 normally executes the accepted transmission job, and the process ends.

On the other hand, if the multifunction device 105 determines in the step S703 that the transmission job accepted in the step S702 is the transmission using the information in the IC card 801, the flow advances to a step S705. In the step S705, the multifunction device 105 locks the IC card 801 so that the IC card 802 cannot be removed from the IC card reader/writer 310 until the transmission ends. For example, "to lock the IC card 801" implies that the IC card insertion port of the IC card reader/writer 310 is mechanically closed. Then, the flow advances to a step S706 to execute the transmission job.

Subsequently, if the transmission job ends in the step S706, the flow further advances to a step S707. In the step S707, the multifunction device 105 unlocks the IC card 801 so that the IC card 801 can be removed from the IC card reader/writer 310.

According to the process as described in the flow chart of FIG. 8, in the case where the user executes the transmission with the electronic signature added by using the information in the IC card, it is possible to prevent that the IC card is removed from the IC card reader/writer 310. Therefore, it is possible to prevent a situation that, if the IC card is removed from the IC card reader/writer 310 before the transmission job is executed or while the transmission job is being executed, the user cannot read out the information in the IC card.

Incidentally, as described above, the multifunction device 105 unlocks the IC card 801 in the step S705. In addition to this operation, for example, it is also possible to set the power saving key 404 so as not to be able to be depressed by the user.

According to the first exemplary embodiment as described above, the logoff of the image processing device can be prevented until the transmission job using the information stored and recorded in the IC card 801 ends.

(Other Exemplary Embodiments)

In addition to the above exemplary embodiment, the present invention may be applied to a system which includes plural devices, or to equipment which includes a single device, such as a scanner, a printer, a PC, a copying machine, a multifunction machine, or a facsimile machine).

Also, the present invention can be achieved by directly or remotely supplying software program codes to realize the respective functions of the above-described exemplary embodiment to the system or the equipment, and reading and executing the supplied program codes with the computer included in the system or the equipment.

Therefore, also the program codes themselves installed to the relevant computer for realizing the respective functions of the above-described exemplary embodiment achieve the present invention. That is, the computer programs themselves for achieving the above functions and processes are included in the present invention.

In that case, because the form of program is no object if it has an actual function as the program, an object code, a program executed by an interpreter, script data supplied to an OS, and the like may be included as the program.

As the storage medium for supplying the program codes, for example, a flexible disk, a hard disk, an optical disk, an MO (magnetooptical) disk, a CR-ROM, a CD-R, a CD-RW, a magnetic tape, a nonvolatile memory card, a ROM, a DVD (DVD-ROM, DVD-R), or the like can be used.

Besides, the program may be downloaded from a website of the Internet/intranet by using a browser of a client computer. That is, the computer program itself of the present invention or a compressed file including an automatic installing function together with the computer program may be downloaded from the relevant website into a recording medium such as a hard disk or the like. Moreover, the present invention can be also achieved by dividing the program codes constituting the program of the present invention into plural files and downloading the respective files from different websites. That is, a WWW server for downloading the program files for achieving the function processes of the present invention with use of the computer to plural users may be included in the scope of the present invention.

Moreover, it is possible to encrypt the program of the present invention, store the encrypted program in a recording medium such as a CD-ROM, and distribute the acquired storage media to the users. In that case, it is possible to cause the user who has satisfied a predetermined condition to download key information for decrypting the encrypted program from the website through the Internet/intranet, decrypt and execute the program encrypted by using the key information, and install the decrypted program into the computer.

Moreover, the respective functions of the above-described exemplary embodiment may be realized by executing the read program with the computer. Besides, an OS (operating system) or the like running on the computer may execute a part or all of the actual process according to instructions of the program. Of course, the respective functions of the above-described exemplary embodiment can be achieved in this case.

In addition, the program read from the recording medium may be written in a memory provided in a function expansion board inserted in the computer or a function expansion unit connected to the computer. Further, a CPU or the like provided in the function expansion board or the function expansion unit may execute a part or all of the actual process according to in instructions of the program. Thus, the functions of the above-described exemplary embodiment may be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-050744, filed on Feb. 27, 2006, which is hereby incorporated by reference herein in its entirety.

What is claimed is:

1. An image processing device comprising:
a reading unit configured to read information stored in a detachable storage medium, wherein the information stored in the detachable storage medium includes a private key;
a transmission unit configured to transmit image data outwardly;
a detection unit configured to detect occurrence of a factor for changing a state of permitting the reading unit to read the information stored in the detachable storage medium to a state of inhibiting the reading unit from reading the information stored in the detachable storage medium;
a determination unit configured to determine, in a case where the transmission unit transmits the image data, whether or not the information stored in the detachable storage medium is necessary; and
a control unit configured to execute, in a case where the detection unit detects the occurrence and the determination unit determines that the information stored in the detachable storage medium is necessary, control to maintain a state capable of reading the information stored in the detachable storage medium until the reading unit reads from the detachable storage medium the information necessary to transmit the image data, and to execute, in a case where the detection unit detects the occurrence and the determination unit determines that the information stored in the detachable storage medium is not necessary, control to change the state to the state of inhibiting the reading unit from reading the information stored in the detachable storage medium.

2. An image processing device according to claim 1, further comprising a user authentication unit configured to authenticate a user who uses the image processing device, by using user information stored in the detachable storage medium,
wherein, in a state that the user authentication unit is authenticating the user, the reading unit can read the information stored in the detachable storage medium, and
wherein, in a state that the detection unit detects that the user authentication unit released user authentication and the user authentication has been released, the reading unit cannot read the information stored in the detachable storage medium.

3. An image processing device according to claim 2, further comprising an operation unit configured to accept a user's operation to the image processing device,
wherein, in the state that the user authentication unit is authenticating the user, in a case where the operation unit does not accept the user's operation for a predetermined time, the control unit executes control to release the authentication of the user.

4. An image processing device according to claim 2, further comprising a power saving instruction acceptance unit configured to accept an instruction to change the state of the image processing device to a power saving state,
wherein, in the state that the user authentication unit is authenticating the user, in a case where the power saving instruction acceptance unit accepts the instruction to change the state of the image processing device to the power saving state, the control unit executes control to release the authentication of the user.

5. An image processing device according to claim 1, wherein, in the state that the control unit executes control to maintain the state capable of reading the information stored in the detachable storage medium until the reading unit reads from the detachable storage medium the information necessary to transmit the image data, the control unit executes control to inhibit the reading unit from reading information from the detachable storage medium after the reading unit read from the detachable storage medium the information necessary to transmit the image data.

6. An image data transmission method which is applied to an image processing device including a reading unit configured to read information stored in a detachable storage medium, the method comprising the steps of:
accepting an execution instruction of a transmission job for transmitting image data outwardly;
detecting occurrence of a factor for changing a state of permitting the reading unit to read the information stored in the detachable storage medium to a state of inhibiting the reading unit from reading the information stored in the detachable storage medium;
determining, in a case where the transmission job of which the execution instruction was accepted in the accepting step is executed, whether or not the information stored in the detachable storage medium is necessary, wherein the information stored in the detachable storage medium includes a private key;
executing the transmission job of which the execution instruction was accepted in the accepting step;
executing, in a case where the occurrence is detected and it is determined in the determining step that the information stored in the detachable storage medium is necessary to execute the transmission job, control to maintain a state capable of reading the information stored in the detachable storage medium until the information necessary in the transmitting step is read from the detachable storage medium; and
executing, in a case where the occurrence is detected and it is determined that the information stored in the detachable storage medium is not necessary, control to change the state to the state of inhibiting the reading unit from reading the information stored in the detachable storage medium.

7. A non-transitory computer-readable storage medium storing a control program that when executed by a computerized image processing device, including a reading unit configured for reading information stored in a detachable storage medium, causes the image processing device to execute an image data transmission method comprising the steps of:
accepting an execution instruction of a transmission job for transmitting image data outwardly;
detecting occurrence of a factor for changing a state of permitting the reading unit to read the information stored in the detachable storage medium to a state of inhibiting the reading unit from reading the information stored in the detachable storage medium;
determining, in a case where the transmission job of which the execution instruction was accepted in the accepting step is executed, whether or not the information stored in the detachable storage medium is necessary, wherein the information stored in the detachable storage medium includes a private key;
executing the transmission job of which the execution instruction was accepted in the accepting step;
executing, in a case where the occurrence is detected and it is determined in the determining step that the information stored in the detachable storage medium is necessary to execute the transmission job, control to maintain a state capable of reading the information stored in the detachable storage medium until the information necessary in the transmitting step is read from the detachable storage medium; and executing, in a case where the occurrence is detected and it is determined that the information stored in the detachable storage medium is not necessary, control to change the state to the state of inhibiting the reading unit from reading the information stored in the detachable storage medium.

* * * * *